United States Patent [19]

Irwin

[11] 3,711,844

[45] Jan. 16, 1973

[54] UPDATABLE MAGNETIC RECORDS

[75] Inventor: John W. Irwin, Longmont, Colo.

[73] Assignee: International Business Machines Corporation, Armonk, N.Y.

[22] Filed: Dec. 16, 1971

[21] Appl. No.: 208,600

[52] U.S. Cl. ..........................................340/174.1 B

[51] Int. Cl...........................G11b 5/44, G11b 19/06

[58] Field of Search ................340/174.1 B, 174.1 G; 346/74 M

[56] References Cited

UNITED STATES PATENTS

| | | | |
|---|---|---|---|
| 3,412,385 | 11/1968 | Weng et al. | 340/174.1 B |
| 3,325,796 | 6/1967 | Orro et al. | 340/174.1 G |
| 3,444,541 | 5/1969 | Irwin | 340/174.1 G |
| 3,193,801 | 7/1965 | Grondin | 340/174.1 |

*Primary Examiner*—Vincent P. Canney
*Attorney*—Herbert F. Somermeyer et al.

[57] ABSTRACT

Digital magnetic records on a magnetic tape are formed independent of velocity deviations from a nominal or design velocity. A given length of media is designated for each record to be recorded. Such length is established to more than accommodate signals to be recorded by a predetermined maximum velocity of transport. Upon completing recording a given block of signals, a padding area is established until a given length of media has been relatively displaced with respect to a transducer regardless of the velocity during recording

10 Claims, 5 Drawing Figures

UPDATABLE MAGNETIC RECORDS

DOCUMENTS INCORPORATED BY REFERENCE

U.S. Pat. application by John W. Irwin, Ser. No. 888,766, filed Dec. 29, 1969, entitled "Intra-Record Resynchronization," now U.S. Pat. 3,641,534.

U.S. Pat. application by John W. Irwin, Ser. No. 77,088, filed Oct. 1, 1970, entitled "Microprogrammable I/O Controller," now U.S. Pat. 3,654,617.

BACKGROUND OF THE INVENTION

The present invention relates to digital magnetic recording systems and particularly to those magnetic tape systems allowing updating records on the tape in place.

The term "update in place" indicates that a block of data signals previously recorded on a magnetic media among other blocks of similar data signals may be altered without having an adverse effect on other data signals. Previously, in those tape recording systems not using a separate sprocket or clock track, when a block of data signals was to be changed on a magnetic tape, the entire tape was re-recorded or re-written. The reason for this action is manyfold. Magnetic tapes in such systems are frictionally driven via a capstan disposed between a pair of vacuum chamber buffers. Because of such frictional drive, plus velocity variations of the capstan (driven by a DC motor), the actual position of the tape with respect to a transducer is usually unknown, i.e., not predictable to a precise degree. Without permanent indicia on the magnetic tape, updating a tape tended to inadvertently destroy recorded data signals. Further, because of required tape interchangeability among a plurality of different tape drives or tape transports and the variation in tape transporting characteristics, all tape transports are adjusted to have "positive creep," that is, as the tape is transported a predetermined distance, the transport is adjusted such that the tape is actually transported a slightly greater distance. This preserves the integrity of the interblock gap (IBG) length between adjacent blocks of data. In those tape transports having two gaps (a read and a write gap), per track the length of the IBG is crucial in order to maintain data integrity. Accordingly, up to the present time, it has been impossible without a separate sprocket or clock track to reliably and repeatedly update a block of data on a magnetic tape with the assurance that other data recorded on the tape is not obliterated or altered unintentionally.

Previous attempts at updating tapes in place included IBM 727 tape transports usually attached to an IBM 704 data processing system. On that system, a tape mark (TM) was a long erased portion of the tape. TM was detected by a time-out circuit and identified boundaries between record files in each tape volume or one reel of tape. A common practice was to record a file, write three TM's, then record another file. The three TM's were written to enable updating the files in place, i.e., eliminating the requirement for rewriting the entire tape whenever a file was to be changed. These three TM's constituted several feet of tape. In this system, the first or most upstream block of data signals in each file separated by the three TM's was an identifier used in search, update, and readback operations for identifying relative tape position for the commanded operation. In such updating, with the safety of three TM's, i.e., several feet of tape between adjacent files, operated successfully on a few sequenced operations. However, because of the positive tape creep referred to above, after a variable number of updates, there was some inadvertent alteration of downstream tape files. Also, this updating required rewriting an entire file of several blocks of data. For data integrity purposes, as a result of such possible inadvertent data destruction, updating data blocks on magnetic tapes is not recommended.

Other attempts at updating records on a magnetic tape without rewriting the entire tape include updating tape labels. Each magnetic tape has a beginning of tape marker (BOT) followed by a tape volume identifier, an IBG, plus two tape volume labels separated by an IBG. Following the second tape label are several inches of erased tape followed by a tape mark consisting of a special code pattern (as opposed to the length of erased tape used on the IBM 727 tape transports). A common practice has been to write a complete tape, rewind the tape to BOT, position on the tape volume identifier, and then update the tape labels. Only two tape labels (blocks of identifying data) were updated at each time. Even with this, in some situations of marginally operated tape transports, downstream data blocks, i.e., the data in the first file following the tape labels, could be partially erased. Accordingly, even updating two blocks at a readily identifiable position on the tape, still exposed a user of such tape to possible inadvertent data erasure.

SUMMARY OF THE INVENTION

It is an object of the present invention to provide a reliably updatable digital magnetic tape record.

In accordance with the present invention, the magnetic record system is operated in an updatable manner by providing a constant length magnetic media length for each record. The record length is established to more than accommodate signals during a predetermined maximum velocity of tape transport for all tape transports with which the magnetic media is to be used. This establishes a maximum record length. Upon completing recording data signals within such given length, a padding area is established between the end of the last record signal until the given length of media has been relatively displaced with respect to the head irrespective of the relative velocity during recording. For a given number of signals to be recorded, a slow transport will cause a short record to be written with a long padding area; while a rapid transport will cause a long record to be written with very short padding.

In a preferred form of the invention, capstan tachometer signals or another tape media displacement indicate the given length. In one form of the invention, the duration, i.e., the length of media displaced per tachometer cycle or half cycle, is selected as a quanta of media length for all records. Then, the number of bytes of data signals to be recorded is divided by the number of bytes per half cycle (or full cycle) of tachometer signal. This division yields the number of tachometer half cycles (or full cycles) representative of media length for the record. A counter tallies the number of tachometer signals for a given byte length record for establishing a given length on the media.

For facilitating updating in place, such given record length may be included as a code set of signals at both ends of the record block. Any tape transport system updating a record in place first reads the number of tachometer signals required for a given record with all updating being limited to a predetermined number of bytes in accordance with the above-described criteria. The IBG length, i.e., the length of an erased portion between adjacent blocks of data, is selected in accordance with known techniques.

The foregoing and other objects, features, and advantages of the invention will be apparent from the following more particular description of a preferred embodiment of the invention, as illustrated in the accompanying drawings.

THE DRAWINGS

DETAILED DESCRIPTION

Figure 1:
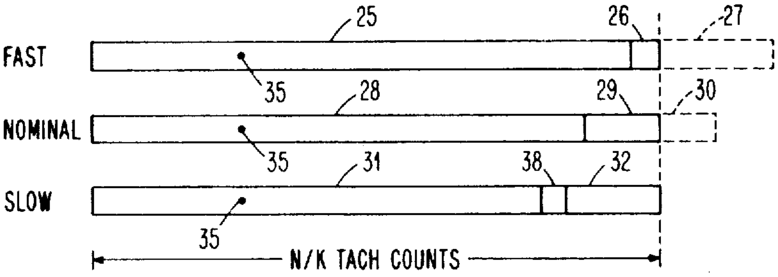
FIG. 1 is a diagrammatic showing of various record lengths on a tape media for different velocities in accordance with the present invention.

The inventive concepts of the present invention are described with respect to FIG. 1 and the relative advantages to previous record padding techniques. It is assumed that a given number of bytes of data is to be recorded on the magnetic media. The physical space required on the media for such fixed number of bytes varies in accordance with the velocity of the tape being transported past a recording transducer. The faster the tape transport, the longer the physical space required for the same number of bytes. For the fastest tape transport, record 35 occupies a space 25 on a record media. On a nominal velocity operating tape drive, record 35 occupies space 28 on the same media. Note that area 28 is shorter than area 25. In a similar manner, a slow tape transport requires but area 31 for recording the same record 35. When tape is to be interchanged among a plurality of transports, it is not known whether the recording transport was fast, nominal, or slow. Accordingly, for an updatable record, the format on the tape must accommodates such velocity variations.

To make a record updatable, accommodation must be provided for adding bytes of data. In many updatable systems, this is done on a percentage basis—for example, 10 percent padding for a given number of bytes. If there are 1,000 bytes on a record, then the padding would occupy 100 byte positions and allow the addition of 100 bytes of data. This is represented by areas 26 and 27 for an updatable padding portion of record 35. For a nominal speed tape transport, the padding areas 29 and 30 are required for providing the 10 percent padding. This is smaller than areas 26 and 27.

Padding areas 32 and 38 for a slow tape transport are yet smaller than areas 29 and 30. In a slow transport, the 10 percent padding area may be the same length for usual padding or padding in accordance with the invention. If the record 35 occupying area 31 is updated by a fast transport for the full 10 percent amount, the padding area 38 will be exceeded possibly inadvertently destroying downstream recorded data signals.

The above problem is rectified by using a tachometer or tape displacement meter for establishing a given media length for all records irrespective of variations in tape transport velocity. The given length is selected in accordance with the fastest expected tape transport, i.e., in accordance with the areas 25 and 27 on a record media. In this manner, the padding area for record 35 in a tape transport is reduced from areas 26 and 27 to area 26, i.e., a very short area. In a nominal speed tape transport, the padding area becomes area 29; and in a slow speed tape transport, the area becomes 38. In this manner, the total media length occupied by record 35 is the same for all tape transports irrespective of velocity deviations. This length is shown as N/K tachometer counts, where K is the number of bytes of data recordable in a tape displacement for a fast tape transport for one tachometer count; and N is the number of bytes in record 35, thereby expressing the media length in N/K counts. N/K is rounded to the next higher integer. N or N/K is preferably recorded at an upstream portion of the record, i.e., to the left as shown in FIG. 1.

Accommodation must also be made for operating the tape on different speed tape transports. For example, the record may be initially recorded on a tape transport operating at 50 inches per second (ips), while the record may be updated while operating at 200 ips. In this case, N/K is not varied if the tachometer system is related to displacement; that is, the number of tachometer cycles per inch of tape transport is the same in the 50 ips tape transport as in the 200 ips tape transport. If there are variations between tape transport tachometer systems, then a coded indicia must be added to the record indicating what tape transport recorded the code indicia. In the alternative, N may be used with a control system for each tape transport, taking N and converting it to its own tachometer system.

Several present-day CPU support programs transfer byte count lengths to the magnetic record subsystem. In such a situation, it is preferred that the invention be practiced such that the CPU program manage the byte count in each record block. When the record is originally recorded, in preparation for updating, the CPU as in most cases, calculates N/K as described herein. For each updating, the magnetic record subsystem tallies the tachometer signal cycle count during the update. It then supplies the count to CPU for justification of byte count with tachometer signal count. Alternately, the magnetic record subsystem can tally both byte and tach counts and perform the justification. Also, it is not necessary that the CPU see that tach count; all updating control can be in the magnetic record subsystem. The CPU would then be restricted to byte count additions to an existing record; no limitation is necessary if the entire tape volume is re-recorded.

As different velocity drives are used, the variation (percentage variations of velocity in the various drives) may differ. Accordingly, the selection of N/K for a given length on the media for all records must be selected in accordance with the greatest variation of tape transports with which the media is to be used.

Figure 2:
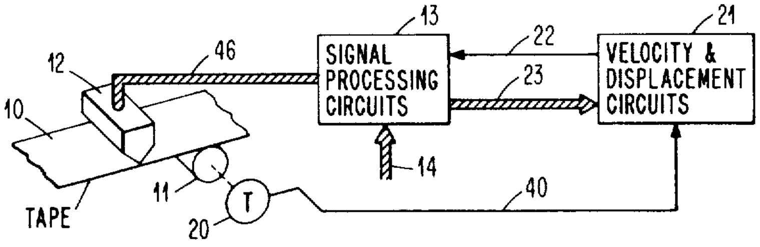
FIG. 2 is a simplified diagrammatic showing of a tape record system using the present invention.

The invention is better understood by further referring to FIG. 2 wherein magnetic tape 10 is transported by rotatable capstan 11 past transducer 12. Transducer 12 may include both read and write gaps. Signal processing circuits 13 receive data signals and supply data signals over cable 14 to and from utilization means (not shown) such as a digital computer. Operation of circuits 13 with respect to transducer 12 is well known and is not described.

In accordance with the present invention, tachometer 20 rigidly attached to capstan 11 supplies tachometer signals 20A over line 40 to velocity and displacement circuits 21. These circuits control capstan 11 by a motor control system (not shown). Additionally, the tachometer signals 20A on line 40 are supplied to signal processing circuits 13 over line 22. Suitable control signals are exchanged between circuits 13 and 21 over cable 23. Signal processing circuits 13 include the apparatus shown in FIG. 3 for accomplishing the ends of the present invention in addition to those circuits normally found in a digital signal magnetic recording system.

Figure 3:
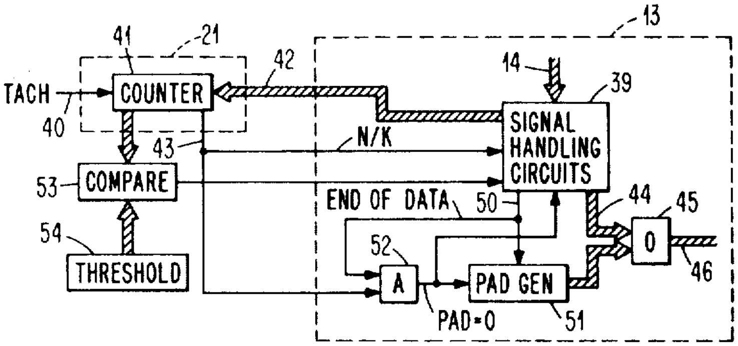
FIG. 3 is a simplified logic diagram used to explain the operation of the FIG. 2 subsystem.

In FIG. 3, tachometer signals 20A received over line 40 decrement tachometer counter 41. Counter 41 is preset to N/K by signals received over cable 42 from signal handling circuits 39 within signal processing circuits 13. Such signal handling circuits may be those described by me in my earlier-filed patent application, Ser. No. 888,766, filed Dec. 29, 1969, supra. A modification of that system could include receiving the number of bytes to be recorded over cable 14 from the controlled data processing system. Alternatively, the number of bytes and N/K count could be computed by the data processing system with the tape subsystem controller not entering into that aspect of the control. In any event, counter 41 is loaded with the count N/K for each given record allowing variable record lengths on a magnetic tape. Counter 41 may be either an up or down counter.

Signal handling circuits 39 supply the signals to be recorded over cable 44 through OR circuits 45, thence to cable 46 connected to transducers 12. During data recording, all of the signals are supplied by circuits 39. Upon receiving a CMDO (command out), end of data is signaled to circuits 39 by a data processing system connected to cable 14. Circuits 39 then generate END OF DATA signal over line 50 actuating PAD GEN 51 to supply padding signals through OR circuit 45. This is coordinated by recording special marker signals as described in my above-referred-to patent applications. Alternatively, PAD GEN 51 may be dispensed with, with an END OF DATA signal being recorded on the media and all other signals on the media being left for the remainder of the given length. In the event the data block is to be quantized in accordance with a predetermined number of tachometer signal cycles, line 43 from counter 41 is attached to a count representative of such quantum. AND circuit 52 is jointly responsive to counter 41 reaching such a reference count and the END OF DATA signal on line 50 to turn off PAD GEN 51 and also signal circuits 39 that the end of padding has been reached. This may or may not be the end of a given length on the media. Such additional padding may be used in connection with identifying the the actual END OF DATA signals within the given length.

In another version, the signals on cable 42 again preset counter 41 to the number N/K. Tachometer signals received over line 40 count down counter 41 toward zero. Line 43 represents counter 41 equal to zero, i.e., the end of a given length for turning off PAD GEN 51 at the end of the given length. In any event, tachometer counter 41 enters into the control of the recording of signals for verifying that the given length has been properly used.

In the event of failure in the recording system, compare circuit 53 receives the count in counter 41 and compares this with the threshold in circuit 54. If the count exceeds a predetermined value, an activating signal is supplied to signal handling circuits 39 causing an interruption of the data processing operation. Suitable recovery and control procedures may be followed at that point not pertinent to the practice of the present invention. Circuit 54 may be program settable or fixed threshold.

Additionally, tach counter 41 output signal on line 43 representative of count N/K may be supplied to signal handling circuits 39 for retransmission to a data processing system.

Figure 4:
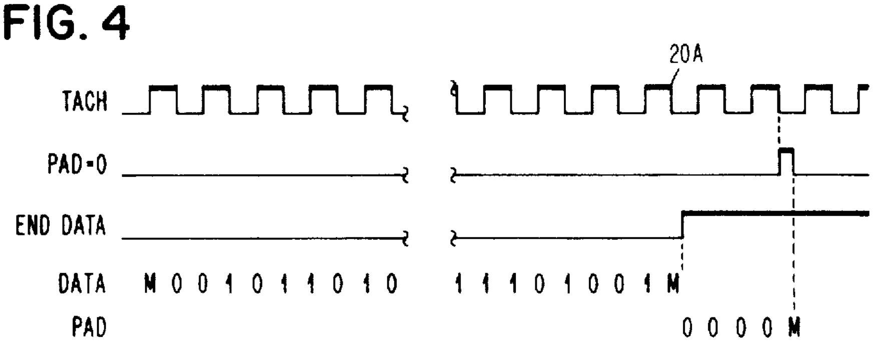
FIG. 4 is a simplified timing diagram illustrating the operation of the FIG. 3 apparatus.

The timing of FIG. 3 is best understood by referring to FIG. 4 wherein the tach signals 20A govern the timing operation of the entire recording system. A PAD=0 signal pulse occurs at the trailing edge of one of the tachometer signals for turning off PAD GEN (padding signal generator) 51. The END DATA signal was activated prior to the PAD=0 pulse and is supplied over line 50 to activate PAD GEN 51 for the duration of the elapsed time between the recording of data and the end of the given length. Alternatively, the END DATA signal may cause nothing to be recorded on the media, dispensing with PAD GEN 51.

Data format can be as shown in my previous patent applications being preceded on each end by suitable marker signals identifying data recording boundaries. The padding may be all 0's, all 1's, or an erased portion of tape. IBG's bracket the given length for identifying the block of data as shown in FIG. 5.

Figure 5:
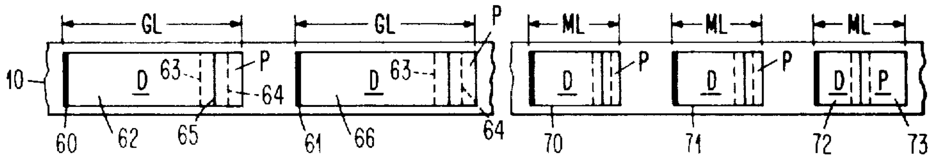
FIG. 5 is an abbreviated diagrammatic showing of a magnetic tape record using the principles of the present invention.

In FIG. 5, media 10 has a plurality of records 62, 66, 70, 71, and 72 recorded thereon. Greatest length (GL) records 62 and 66 are preceded by marker signals 60 and 61 identifying the beginning of a record block with is updatable. Predetermined code permutations are recorded identifying that the record is updatable, the length of the record in N/K tach counts, and any other desired identifying indicia. Data portion D of these two GL records will vary between lines 63 and 64 in accordance with velocity variations of the tape transport as described with respect to FIG. 1. Padding portion P constitutes the terminal portion of each given length in which the greatest length records are recorded.

Record 70 is the minimum length (ML) record. It also has a heading portion identifying that it is a minimum length record, etc. Its data portion length varies between the dotted lines within the record symbol with a padding portion P to the end of the given length. Record block 71 is constituted in the same manner.

In the event of a shorter data block 72, then the minimum length is to be recorded. Padding area P may constitute practically all of the given length ML. In any event, updatable records are provided by using tachometer signals, i.e., tape displacement, during a maximum tape transport condition to identify an updatable record within a given length on the media. Such tachometer measurements are somewhat independent of tape creep characteristics and, by selecting the relationship of the tape media length in accordance with the fastest transport, are independent of velocity variations, the latter being a salient feature of the present invention.

Suitable readback systems can be employed to read such records. Calculation of the given lengths is easily programmed either on a programmable I/O controller as described in my copending application, Ser. No. 77,088, filed Oct. 1, 1970, supra, or in a CPU.

While the invention has been particularly shown and described with reference to a preferred embodiment thereof, it will be understood by those skilled in the art that various changes in form and details may be made therein without departing from the spirit and scope of the invention.

What is claimed is:

1. The method of establishing a constant length magnetic record relatively independent of velocity deviations of media-head motion from a nominal velocity, including the following steps in combination:
establishing a given length of media for corresponding signals to be recorded;
establishing the length to more than accommodate such signals during a predetermined maximum velocity; and
upon completion of recording, establishing a padding area on such media until the given length of media has been relatively displaced with respect to said head irrespective of the relative velocity during recording.

2. The method of claim 1 further including establishing a given minimum length as a quanta of record media and establishing all record lengths as an integral number of said quanta; and
establishing erased portions between adjacent records.

3. The method set forth in claim 1 wherein said magnetic media is an elongated magnetic member and further including the steps of initially formatting the magnetic member with magnetic indicia spaced apart at predetermined intervals determined by said given lengths and subsequently recording said signals beginning in accordance with said indicia, and said given lengths extending in the same direction along said member whereby recording and readback of said signals are always indicated by said indicia.

4. The method set forth in claim 1 wherein said signals are digital signals in a plurality of tracks disposed transverse to the direction of relative motion with a given number of digital signals being associated with a given length on said media in the direction of relative motion at a nominal velocity;
said given length being determined by said given number of digital signals; and
counting the displacement in terms of said digital signals and comparing the counted number of digital signals with a threshold for indicating excessive deviations in recording.

5. The method set forth in claim 4 further including using a tachometer associated with the driving means of the relative motion for establishing relative displacement indications, said driving means generating digital signals having a frequency substantially lower than the digital signals being recorded and defining quantum of media length for a given number of digital signals; and
selecting an integral number of said digital signals and of said tachometer signals as a criteria for determining said given length.

6. The method set forth in claim 5 further including taking a media which has already been recorded in accordance with claim 5, establishing relationships between the recorded tape and a signal-handling circuit, and causing predetermined motion of said media with respect to a transducer as indicated by the tachometer, then re-recording signals on said media based upon the tachometer signals and the previously recorded signals whereby information content in a given record block is updated in place in accordance with the tachometer stabilizing the length of the data record on the media within limits of said given length in accordance with velocity variations of said media relative motion; and establishing padding areas within said given length in accordance with the difference between the data recording length and said given length whereby the effective record length on said media remains substantially constant during updating operations.

7. An updatable magnetic record member, including the combination:
a plurality of record areas each of predetermined length in accordance with an expected maximum relative velocity of member transport for a given number of digital data signals recorded in each such record area; and
each record area having a record portion of a length in accordance with a given velocity of recording less than said expected maximum velocity and any remaining portion being a padding area enabling selective changing of signals in said record area independent of other record areas.

8. A magnetic recording system for recording digital data signals as a block of signals on a magnetic tape, a magnetic transducer, signal processing circuits for supplying signals to be recorded to said transducer;
tape displacement sensing means generating signals indicating quanta of tape displacement;
means indicating the number of digital data signals being recorded in a block of such signals;
means in said signal processing circuits comparing said tape displacement indicating signals and said number indication for establishing a result number indicating a given length on said media for recording blocks of such data signals thereon in accordance with the maximum design velocity of any tape transport with which said tape is to be used; and
means responsive to said result signal to establish said given length to be longer in the tape than the length required to record said indicated number of signals by a maximum tape velocity operating transport.

9. The recording system set forth in claim 8 further including means in said signal processing circuit for recording padding signals in a padding area between recorded digital data signals on the media and an end of said given length.

10. The recording system set forth in claim 9 further including compare means having threshold means responsive to a given count of displacement signals to signal an error condition.

* * * * *